United States Patent
Hegde (10) Patent No.: US 12,356,320 B2
(45) Date of Patent: Jul. 8, 2025

(54) USER PLANE FUNCTION SELECTION AND HOSTING FOR REAL-TIME APPLICATIONS

(71) Applicant: Outdoor Wireless Networks LLC, Richardson, TX (US)

(72) Inventor: Harsha Hegde, Buffalo Grove, IL (US)

(73) Assignee: Outdoor Wireless Networks LLC, Richardson, TX (US)

( * ) Notice: Subject to any disclaimer, the term of this patent is extended or adjusted under 35 U.S.C. 154(b) by 238 days.

(21) Appl. No.: 17/840,090

(22) Filed: Jun. 14, 2022

(65) Prior Publication Data

US 2022/0408353 A1    Dec. 22, 2022

Related U.S. Application Data

(60) Provisional application No. 63/212,401, filed on Jun. 18, 2021.

(51) Int. Cl.
*H04W 48/18*    (2009.01)
*H04W 24/08*    (2009.01)
(Continued)

(52) U.S. Cl.
CPC ........... *H04W 48/18* (2013.01); *H04W 24/08* (2013.01); *H04W 28/0284* (2013.01); *H04W 64/00* (2013.01)

(58) Field of Classification Search
CPC ................. H04W 48/18; H04W 24/08; H04W 28/0284; H04W 64/00; H04W 24/02; H04W 88/085
(Continued)

(56) References Cited

U.S. PATENT DOCUMENTS 10,944,668 B2    3/2021  Rajagopal et al.
2017/0126618 A1*   5/2017  Bhaskaran .......... H04L 61/5014
(Continued)

FOREIGN PATENT DOCUMENTS

WO    2020132308 A2    6/2020

OTHER PUBLICATIONS

Brown, Gabriel, "New Transport Network Architectures for 5G RAN", Heavy Reading white paper produced for Fujitsu, at least as early as Jan. 2021, pp. 1 through 11.
(Continued)

*Primary Examiner* — Charles N Appiah
*Assistant Examiner* — Frank E Donado
(74) *Attorney, Agent, or Firm* — Fogg & Powers LLC (57) ABSTRACT

Systems and methods for reducing latency in the data path between a source and destination and managing resources in a 5G network are provided. The systems and methods described herein include dynamically selecting user plane functions (UPFs) and/or dynamically placing UPFs at particular locations within the 5G network. In some examples, each UPF in the 5G network is statically placed, and the UPF used for communication between a source and destination is dynamically selected based on control plane data. In other examples, UPFs are dynamically placed, and the UPF used for communication is dynamically selected to reduce latency and/or resource usage based on control plane data. In other examples, UPFs are dynamically placed, and the UPF used for communication is dynamically selected to reduce latency and/or resource usage based on user plane data after the flow of packets has started between a source and destination.

19 Claims, 5 Drawing Sheets

(51) Int. Cl.
*H04W 28/02* (2009.01)
*H04W 64/00* (2009.01)

(58) Field of Classification Search
USPC .......................................................... 455/43
See application file for complete search history.

(56) References Cited

U.S. PATENT DOCUMENTS

| | | | |
|---|---|---|---|
| 2019/0037474 A1* | 1/2019 | Xu ........................ | H04W 16/00 |
| 2019/0182875 A1 | 6/2019 | Talebi Fard et al. | |
| 2019/0274181 A1 | 9/2019 | Zhu et al. | |
| 2020/0178149 A1 | 6/2020 | Seenappa et al. | |
| 2020/0304408 A1* | 9/2020 | Suthar ................... | H04L 67/141 |
| 2020/0329008 A1* | 10/2020 | Dao ..................... | H04L 61/5007 |
| 2020/0374691 A1* | 11/2020 | Li .......................... | H04W 12/02 |
| 2021/0006626 A1* | 1/2021 | Dodd-Noble ......... | H04W 40/24 |
| 2021/0014737 A1 | 1/2021 | Yang et al. | |
| 2021/0153080 A1* | 5/2021 | Zhu ................... | H04W 36/0011 |
| 2022/0053390 A1* | 2/2022 | Kim .................. | H04W 36/0061 |

OTHER PUBLICATIONS

3rd Generation Partnership Project (3GPP), "3rd Generation Partnership; Technical Specification Group Services and System Aspects; System architecture for the 5G System (5GS); Stage 2 (Release 17)", 3GPP TS 23.502 V 17.0.0, Mar. 2021, p. Cover through 646.
3rd Generation Partnership Project (3GPP), "3rd Generation Partnership; Technical Specification Group Services and System Aspects; System architecture for the 5G System (5GS); Stage 2 (Release 17)", 3GPP TS 23.501 V 17.0.0, Mar. 2021, p. Cover through 489.
Network Functions Virtualisation (NFV) ETSI Industry Specification Group (ISG), "Network Functions Virtualisation (NFV) Release 2; Management and Orchestration; Architectural Framework Specification" ETSI GS NFV 006 V2.1.1, Jan. 2021, pp. 1 through 15.
International Searching Authority, "International Search Report and Written Opinion from PCT Application No. PCT/US2022/033456 dated Sep. 28, 2022", from Foreign Counterpart to U.S. Appl. No. 17/840,090, pp. 1 through 11, Published in: KR.

* cited by examiner

USER PLANE FUNCTION SELECTION AND HOSTING FOR REAL-TIME APPLICATIONS

CROSS-REFERENCE TO RELATED APPLICATION

The present application claims priority to U.S. Provisional Application No. 63/212,401, filed on Jun. 18, 2021, with the United States Patent and Trademark Office, the entire contents of which are incorporated by reference herein for all purposes.

BACKGROUND

Cloud-based virtualization of Fifth Generation (5G) base stations (also referred to as "g NodeBs" or "gNBs") is widely promoted by standards organizations, wireless network operators, and wireless equipment vendors. Such an approach can help provide better high-availability and scalability solutions as well as addressing other issues in the network.

Figure 1:
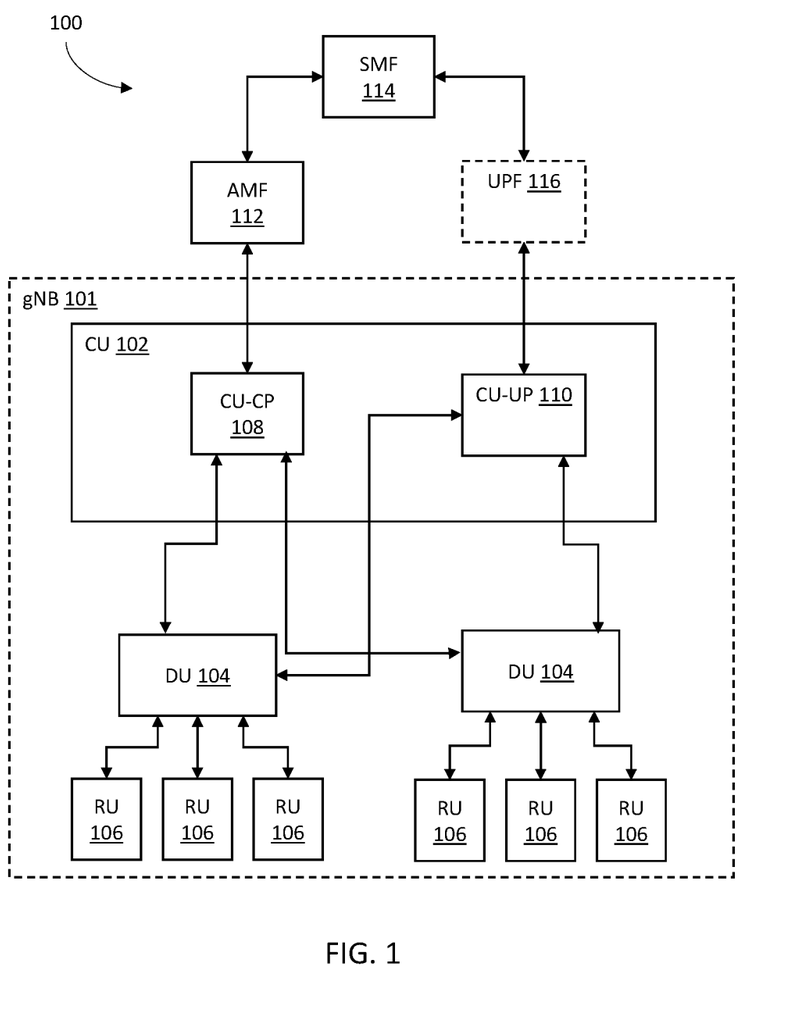
FIG. 1 is a block diagram illustrating a 5G network with a distributed 5G gNB.

FIG. 1 is a block diagram illustrating a typical 5G network 100 with a distributed gNB 101. In general, a distributed 5G gNB can be partitioned into different entities, each of which can be implemented in different ways. For example, each entity can be implemented as a physical network function (PNF) or a virtual network function (VNF) and in different locations within an operator's network (for example, in the operator's "edge cloud" or "central cloud").

In the particular example shown in FIG. 1, a distributed 5G gNB 101 is partitioned into one or more central units (CUs) 102, one or more distributed units (DUs) 104, and one or more radio units (RUs) 106. In this example, each CU 102 is further partitioned into a central unit control-plane (CU-CP) 108 and one or more central unit user-planes (CU-UPs) 110 dealing with the gNB Packet Data Convergence Protocol (PDCP) and higher layers of functions of the respective control and user planes of the gNB 100. Each DU 104 is configured to implement the upper part of the physical layer through the radio link control layer of both the control-plane and user-plane of the gNB 100. In this example, each RU 106 is configured to implement the radio frequency (RF) interface and lower physical layer control-plane and user-plane functions of the gNB 100.

Each RU 106 is typically implemented as a physical network function (PNF) and is deployed in a physical location where radio coverage is to be provided. Each DU 104 is typically implemented as a virtual network function (VNF) and, as the name implies, is typically distributed and deployed in a distributed manner in the operator's edge cloud. Each CU-CP 108 and CU-UP 110 are typically implemented as a virtual network functions (VNFs) and, as the name implies, are typically centralized and deployed in the operator's central cloud.

In the core network, the 5G network 100 includes one or more Access and Mobility Management Functions (AMFs) 112, a Session Management Function (SMF) 114, and one or more User Plane Functions (UPFs) 116. In the example shown in FIG. 1, the one or more AMFs 112 are communicatively coupled to the CU-CP 108. The one or more AMFs 112 receive connection and session related information from the user equipment (UE) connecting to the 5G network 100 via the distributed gNB 101. The AMF 112 is responsible for handling authentication, connection, and mobility management tasks for the control plane.

In the example shown in FIG. 1, the 5G network 100 further includes a SMF 114 communicatively coupled to the AMF 112. The SMF 114 is responsible for session management, IP address allocation, and control of policy enforcement for the control plane. The SMF 114 also interacts with the decoupled data plane, creates/updates/removes Protocol Data Unit (PDU) sessions, and manages session context with the one or more UPFs 116.

In the example shown in FIG. 1, the 5G network 100 further includes one or more UPFs 116 communicatively coupled to the SMF 114 and the one or more CU-UPs 110. The one or more UPFs 116 are responsible for Packet Data Convergence Protocol (PDCP), security, policies, etc. for the user plane.

SUMMARY

In an example, a system comprises a scalable cloud environment configured to implement a base station using a plurality of virtualized base station entities, wherein each virtualized base station entity of the plurality of virtualized base station entities is configured to implement at least some functions for one or more layers of a wireless interface used to communicate with user equipment. The scalable cloud environment is further configured to implement one or more user plane function (UPF) instances that are instantiated at one or more locations of the system, wherein the one or more UPF instances are communicatively coupled to at least one virtualized base station entity of the plurality of virtualized base station entities. The scalable cloud environment is further configured to implement one or more virtualized network entities communicatively coupled to the one or more UPF instances. The one or more virtualized network entities are configured to instantiate the one or more UPF instances at the one or more locations of the system; monitor control plane data and/or user plane data from the user equipment; determine a location of the user equipment and a destination; and select a particular UPF instance for a communication path used by the user equipment based on the control plane data, the user plane data, and/or the location of the user equipment and the destination.

In another example, a method comprises using a scalable cloud environment to implement a base station using a plurality of virtualized entities, wherein each virtualized entity of the plurality of virtualized entities is configured to implement at least some functions for one or more layers of a wireless interface used to communicate with user equipment. The method further comprises using the scalable cloud environment to implement one or more user plane functions (UPFs) instantiated at one or more locations in a network, wherein the one or more UPFs are communicatively coupled to at least one virtualized entity of the plurality of virtualized entities. The method further comprises using the scalable cloud environment to implement one or more virtualized network entities communicatively coupled to the one or more UPFs. The one or more virtualized network entities are configured to: instantiate the one or more UPFs at the one or more locations in the network; monitor control plane data and/or user plane data from the user equipment; determine a location of the user equipment and a destination; and select a particular UPF of the one or more UPFs for a communication path used by the user equipment based on the control plane data, the user plane data, and/or the location of the user equipment and the destination.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be used and that logical, mechanical, and electrical changes may be made. The following detailed description is, therefore, not to be taken in a limiting sense.

In 5G networks, user plane data has to traverse a defined path. In the uplink, the path starts at an application and then proceeds sequentially from the UE to the DU, the CU-UP, a UPF, an application server, and a peer application. In the downlink, the path starts at the peer application and then proceeds sequentially to the application server, the UPF, the CU-UP, the DU, the UE, and the application. The user plane data has to traverse this path irrespective of the locality of the application, application server, and the peer application, and this path determines the latency for the packets from source to destination. If the UPF is distant from the source and the destination, the latency will be greater for the user plane data. For real-time applications and Ultra-Reliable Low-Latency Communication (URLLC) use cases, low latency is required in order to meet application needs.

The systems and methods described herein provide low latency and resource management for a 5G network by dynamically selecting and/or placing UPFs. In some examples, each UPF in the 5G network is statically placed, and the UPF used for communication between a source and destination is dynamically selected to reduce latency based on control plane data. In other examples, UPFs in the 5G network are dynamically placed, and the UPF used for communication is dynamically selected to reduce latency and/or resource usage based on control plane data. In other examples, UPFs in the 5G network are dynamically placed, and the UPF used for communication is dynamically selected to reduce latency and/or resource usage based on user plane data after the flow of packets has started between a source and destination.

Figure 2:
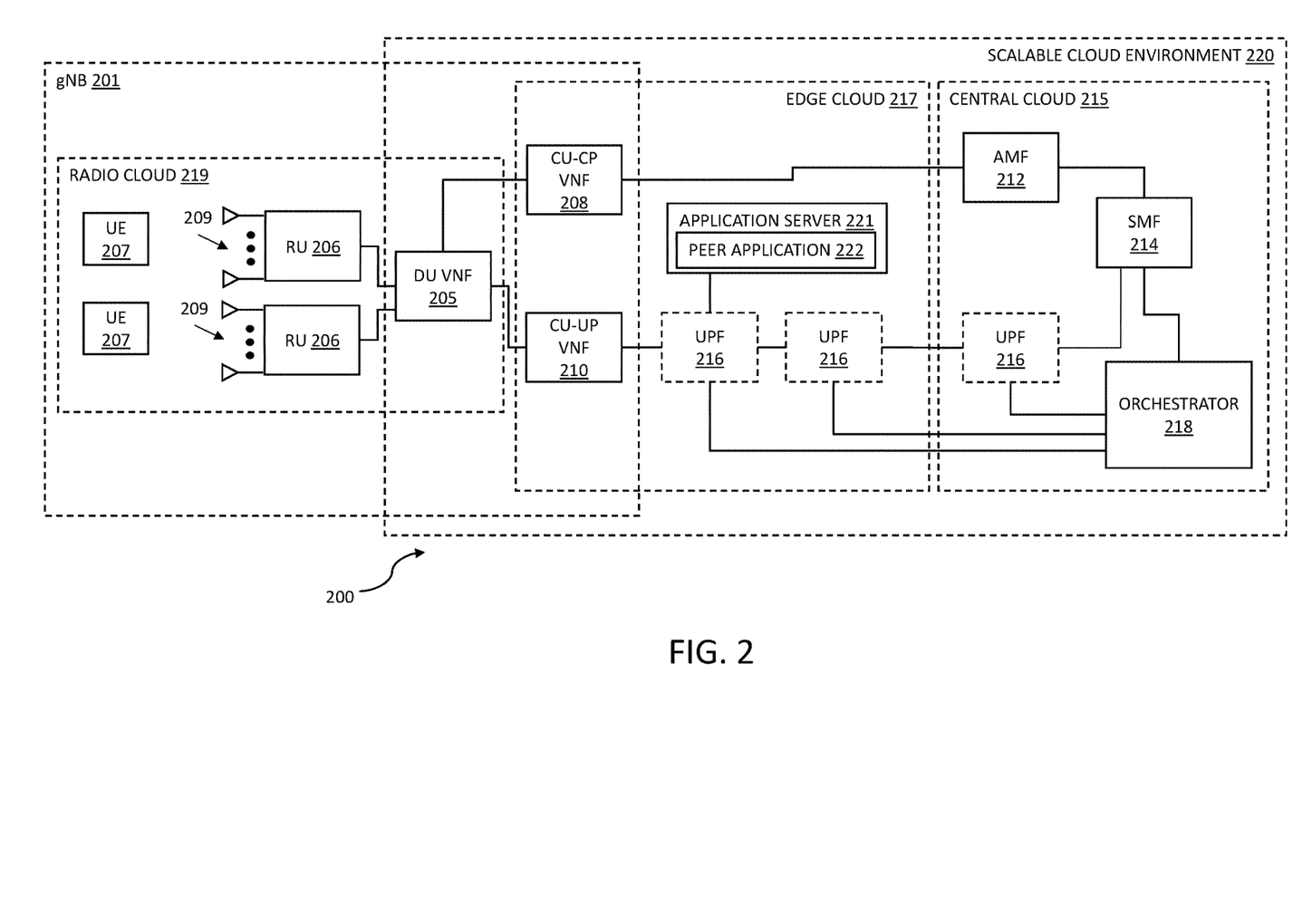
FIG. 2 is a block diagram of a 5G network utilizing virtualization.

FIG. 2 is a block diagram illustrating one example 5G network 200 utilizing virtualization in which the dynamic UPF selection and hosting described here can be used. In the particular example shown in FIG. 2, the 5G network 200 includes a virtualized 5G gNB 201 that is partitioned into one or more central units (CUs), which is composed of one CU-CP virtual network function 208 and one or more CU-UP virtual network functions 210, one or more distributed units (DUs), which are composed of one or more DU virtual network functions 205, and one or more radio units (RUs) 206. In this example, the virtualized 5G gNB 201 is configured so that each CU (including CU-CP VNF 208 and CU-UP VNFs 210) is configured to serve one or more DUs (including DU VNFs 205), and each DU is configured to serve one or more RUs 206. In the particular configuration shown in FIG. 2, a single CU serves a single DU, and the DU shown in FIG. 2 serves two RUs 206. However, the particular configuration shown in FIG. 2 is only one example; other numbers of CUs, DUs, and RUs 206 can be used. Also, the number of DUs served by each CU can vary from CU to CU; likewise, the number of RUs 206 served by each DU can vary from DU to DU. Moreover, although the following embodiments are primarily described as being implemented for use to provide 5G NR service, it is to be understood the techniques described here can be used with other wireless interfaces (for example, fourth generation (4G) Long-Term Evolution (LTE) service) and references to "gNB" can be replaced with the more general term "base station" or "base station entity" and/or a term particular to the alternative wireless interfaces (for example, "enhanced NodeB" or "eNB"). Furthermore, it is also to be understood that 5G NR embodiments can be used in both standalone and non-standalone modes (or other modes developed in the future) and the following description is not intended to be limited to any particular mode. Also, unless explicitly indicated to the contrary, references to "layers" or a "layer" (for example, Layer 1, Layer 2, Layer 3, the Physical Layer, the MAC Layer, etc.) set forth herein refer to layers of the wireless interface (for example, 5G NR or 4G LTE) used for wireless communication between a base station and user equipment).

In general, the virtualized gNB 201 is configured to provide wireless service to various numbers of user equipment (UEs) 207 using one or more cells (only one of which is shown in FIG. 2 for ease of illustration). Each RU 206 includes or is coupled to a respective set of one or more antennas 209 via which downlink RF signals are radiated to UEs 207 and via which uplink RF signals transmitted by UEs 207 are received.

In one configuration (used, for example, in indoor deployments), each RU 206 is co-located with its respective set of antennas 209 and is remotely located from the DU VNF 205, CU-CP VNF 208, and CU-UP VNF 210 serving it as well as the other RUs 206. In another configuration (used, for example, in outdoor deployments), the respective sets of antennas 209 for multiple RUs 206 are deployed together in a sectorized configuration (for example, mounted at the top of a tower or mast), with each set of antennas serving a different sector. In such a sectorized configuration, the RUs 206 need not be co-located with the respective sets of antennas 209 and, for example, can be co-located together (for example, at the base of the tower or mast structure) and, possibly, co-located with its serving DU VNFs 205. Other configurations can be used.

The virtualized gNB 201 is implemented using a scalable cloud environment 220 in which resources used to instantiate each type of entity can be scaled horizontally (that is, by increasing or decreasing the number of physical computers or other physical devices) and vertically (that is, by increasing or decreasing the "power" (for example, by increasing the amount of processing and/or memory resources) of a given physical computer or other physical device). The scalable cloud environment 220 can be implemented in various ways. For example, the scalable cloud environment 220 can be implemented using hardware virtualization, operating system virtualization, and application virtualization (also referred to as containerization) as well as various combinations of two or more of the preceding. The scalable cloud environment 220 can be implemented in other ways. For example, as shown in FIG. 2, the scalable cloud environment 220 is implemented in a distributed manner. That is, the scalable cloud environment 220 is implemented as a distributed scalable cloud environment 220 comprising at least one central cloud 215, at least one edge cloud 217, and at least one radio cloud 219.

In the example shown in FIG. 2, each RU 206 is implemented as a physical network function (PNF) and is deployed in or near a physical location where radio coverage is to be provided. In this example, each DU is implemented with one or more DU VNFs 205 and, as the name implies, is distributed and deployed in a distributed manner in the radio cloud 219. Each CU-CP is implemented as a CU-CP VNF 208 and each CU-UP is implemented as a CU-UP VNF 210 and, as the name implies, are centralized and deployed in the edge cloud 217. In the example shown in FIG. 2, the CU (including the CU-CP VNF 208 and CU-UP VNFs 210) and the entities used to implement it are communicatively coupled to each DU VNF 205 served by the CU over a midhaul network (for example, a network that supports the Internet Protocol (IP)). In the example shown in FIG. 2, each DU VNF 205 is communicatively coupled to each RU 206 served by the DU VNF 205 using a fronthaul network (for example, a switched Ethernet network that supports the IP).

In the example shown in FIG. 2, the 5G network 200 further includes an AMF 212 communicatively coupled to the CU-CP VNF 208 and a SMF 214 communicatively coupled to the AMF 212. In the example shown in FIG. 2, the 5G network 200 further includes UPF 216 instances, which are communicatively coupled to the SMF 214 and the CU-UP VNF 210. In some examples, a single UPF is communicatively coupled between the CU-UP VNF 210 and the SMF 214. In other examples, more than one UPF 216 is communicatively coupled between the CU-UP VNF 210 and the SMF 214.

In the example shown in FIG. 2, the 5G network 200 further includes an orchestrator 218, which is also referred to herein as orchestration function 218. In some examples, the orchestration function 218 is a virtual network function manager (VNFM). In some examples, the orchestration function 218 receives load information, information regarding the applications (for example, VNFs) running, and other information from the nodes in the 5G network 200. The orchestration function 218 is configured to utilize the information received from the nodes in the 5G network 200 and make decisions based on this information. For example, the orchestration function 218 is configured to start applications, move applications, shutdown applications, etc. based on the incoming information from the nodes in the 5G network 200.

The scalable cloud environment 220 can include one or more cloud worker nodes that are configured to execute cloud native software that, in turn, is configured to instantiate, delete, communicate with, and manage one or more virtualized entities. For example, where the latency reduction and resource management techniques described here are implemented at the operating system virtualization level, the cloud worker nodes comprise respective clusters of physical worker nodes (or virtualized worker nodes if implemented in combination with hardware virtualization), the cloud native software comprises a shared host operating system, and the virtualized entities comprise containers. In another example, where the latency reduction and resource management techniques described here are implemented at the hardware virtualization level, the cloud worker nodes comprise respective clusters of physical worker nodes, the cloud native software comprises a hypervisor (or similar software), and the virtualized entities comprise virtual machines.

In some examples, a node of the scalable cloud environment 220 is designated as the cloud "master" node. The cloud master node is configured to implement management and control plane processes for the worker nodes in a cluster. In some examples, the master node can include the orchestration function 218. In some examples, the orchestration function 218 of the cloud master node is configured to determine what runs on each of the cloud worker nodes, which can include scheduling, resource allocation, state maintenance, and monitoring. In some examples, the orchestration function 218 of the cloud master node is configured to manage the lifecycle, scaling, and upgrades of workloads (such as containerized applications) on the cloud worker nodes.

In the example shown in FIG. 2, each DU VNF 205, CU-CP VNF 208, CU-UP VNF 210, AMF 212, SMF 214, and UPF 216 is implemented as a software virtualized entity that is executed in the scalable cloud environment 220 on a cloud worker node under the control of the cloud native software executing on that cloud worker node. In the following description, a cloud worker node that implements at least a part of a CU (for example, a CU-CP VNF 208 and/or a CU-UP VNF 210) is also referred to here as a "CU cloud worker node," and a cloud worker node that implements a DU VNF 205 is also referred to here as a "DU cloud worker node."

In some examples, the CU-CP VNF 208 and the CU-UP VNF 210 are each implemented as a single virtualized entity executing on the same cloud worker node. In other examples, the CU-CP VNF 208 and the CU-UP VNF 210 are each implemented as a single virtualized entity executing on a different cloud worker node. In some examples, the DU VNF 205 is implemented as a single virtualized entity executing on a single cloud worker node. However, it is to be understood that different configurations and examples can be implemented in other ways. For example, the CU can be implemented using multiple CU-UP VNFs 210 and using multiple virtualized entities executing on one or more cloud worker nodes. In another example, multiple DU VNFs 205 (using multiple virtualized entities executing on one or more cloud worker nodes) can be used to serve a cell, where each of the multiple DU VNFs 205 serves a different set of RUs 206. Moreover, it is to be understood that the CU and DU can be implemented in the same cloud (for example, together in the edge cloud 217 or the radio cloud 219). Other configurations and examples can be implemented in other ways.

In the 5G network 200 of FIG. 2, the UE 207 is the source UE for packets and the peer application 222 is the destination for packets. Thus, in the 5G network 200, the user plane data, in the uplink, has to traverse a path that starts at an application and then proceeds sequentially to the UE 207, the DU VNF 205, the CU-UP VNF 210, a UPF 216, an application server 221, and a peer application 222. In the downlink, the path starts at the peer application 222 and then proceeds sequentially to the application server 221, the UPF 216, the CU-UP VNF 210, the DU VNF 205, the UE 207, and the application. As discussed above, the user plane data has to traverse this path irrespective of the locality of the application, application server 221, and the peer application 222. The methods described below can be implemented in the 5G network 200 in order to reduce latency as needed for real-time applications and Ultra-Reliable Low-Latency Communication (URLLC) use cases and/or manage resources of the 5G network 200.

Figure 3:
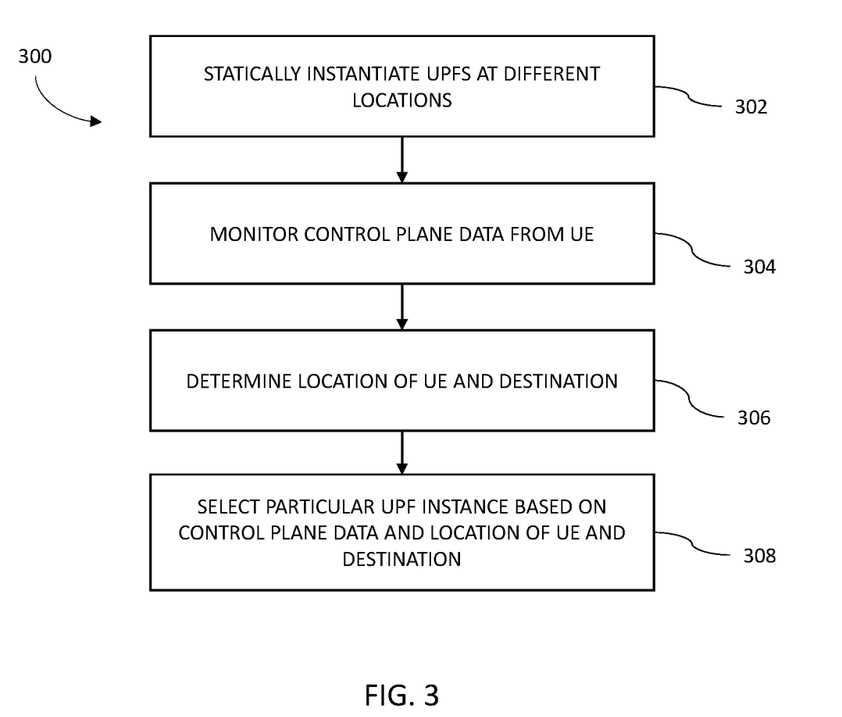
FIG. 3 is a flow diagram of an example method for dynamic user plane function selection.

FIG. 3 is a flow diagram of an example method 300 for reducing latency in a 5G network. The common features discussed above with respect to the 5G networks 100, 200 in FIGS. 1-2 can include similar characteristics to those discussed with respect to method 300 and vice versa.

The method 300 begins with statically instantiating multiple UPF instances at different locations in the 5G network (block 302). In some examples, the UPF instances are instantiated using one or more virtualized network entities (for example, the SMF 214 and/or orchestration function 218) communicatively coupled to the one or more UPF instances. In some examples, the orchestration function is configured to statically instantiate the multiple UPF instances based on information in a data file (for example, a manifest). In some examples, the data file is generated and updated by the SMF.

In this context, the instantiation (placement) of the multiple UPF instances is static in that the UPF instances are instantiated at startup rather than runtime and prior to establishing communication with UEs. In some examples, the data file includes information regarding the available resources in the 5G network where a UPF instance can be instantiated, the affinity requirements for each UPF instance (for example, the cloud (radio, edge, or central) node affinity or pod affinity with a CU-CP VNF or CU-UP VNF), and information regarding the current location of UPF instances. In some examples, the data file defines a map with the nodes of the 5G network, IP addresses associated with the nodes of the 5G network, applications associated with the nodes of the 5G network, and the like. In some examples, a SMF of the 5G network generates and updates the data file used by orchestration function and the data file essentially functions as a map for the orchestration function so it is aware of the resources where the applications (for example, VNFs) can be run in the 5G network.

In some examples, at least one UPF instance of the multiple UPF instances is statically instantiated in the edge cloud or the radio cloud of the 5G network. In some examples, at least one UPF instance is statically instantiated in the central cloud of the 5G network. In some examples, the at least one UPF instance of the multiple UPF instances is collocated with the CU-CP VNF (for example, having pod affinity with the CU-CP VNF) and/or the CU-UP VNF (for example, having pod affinity with the CU-UP VNF) in the radio cloud or the edge cloud.

The method 300 further includes monitoring control plane data from a UE (block 304). In some examples, the control plane data from the UE is monitored when a session is being established with the UE. In some examples, the control plane data is monitored by the one or more virtualized network entities communicatively coupled to the one or more UPF instances. The control plane data can include, for example, a type of bearer (for example, a guaranteed bit rate (GBR) bearer) requested by the UE, a parameter indicating quality of service (QoS) requirements of each packet (for example, QoS Class Identifier (QCI)), a type of network, a data network name for the UE, and/or a data network name for the destination of packets.

The method 300 further includes determining a location of the UE and a destination (block 306). In some examples, the one or more virtualized network entities communicatively coupled to the one or more UPF instances determine the location of the UE and the destination based on the CU and the radio cloud that is being communicated with for the source UE and the destination for the packets. In some examples, the one or more virtualized network entities use the data network name associated with the source UE and the destination to determine a location of the UE and destination since the source UE and destination for the packets will not be known prior to transmission of the packets. In such examples, the one or more virtualized network entities treat all UEs in a data network as local and the data network can be classified as a local network for those UEs. Any UE that requests to communicate with the data network is classified as being in the radio cloud serving that data network.

The method 300 further includes selecting a particular UPF instance to use for communication based on the control plane data and the location of the source UE and destination (block 308). In some examples, the one or more virtualized network entities (for example, the SMF) selects the particular UPF instance. When the control plane data from the UE indicates that UE is requesting a GBR bearer and/or higher QoS requirements (for example, URLLC cases), the one or more virtualized network entities will select a particular UPF instance from the statically instantiated UPF instances such that latency between source UE and the destination is minimized. In some examples, the particular UPF instance that is closest to the source UE and the destination is selected. In some examples, the one or more virtualized network entities select the particular UPF instance from the statically instantiated UPF instances that is closest to the data network of the source UE and/or the destination. In some examples, the one or more virtualized network entities select the particular UPF instance from the statically instantiated UPF instances UPF that provides the shortest path between the source UE and the destination.

When the control plane data from the UE indicates that the UE is requesting a bearer and/or lower QoS requirements, the one or more virtualized network entities can select a particular UPF instance from the statically instantiated UPF instances that is farther away from the source UE and the destination since latency does not need to be reduced as much for these situations.

Figure 4:
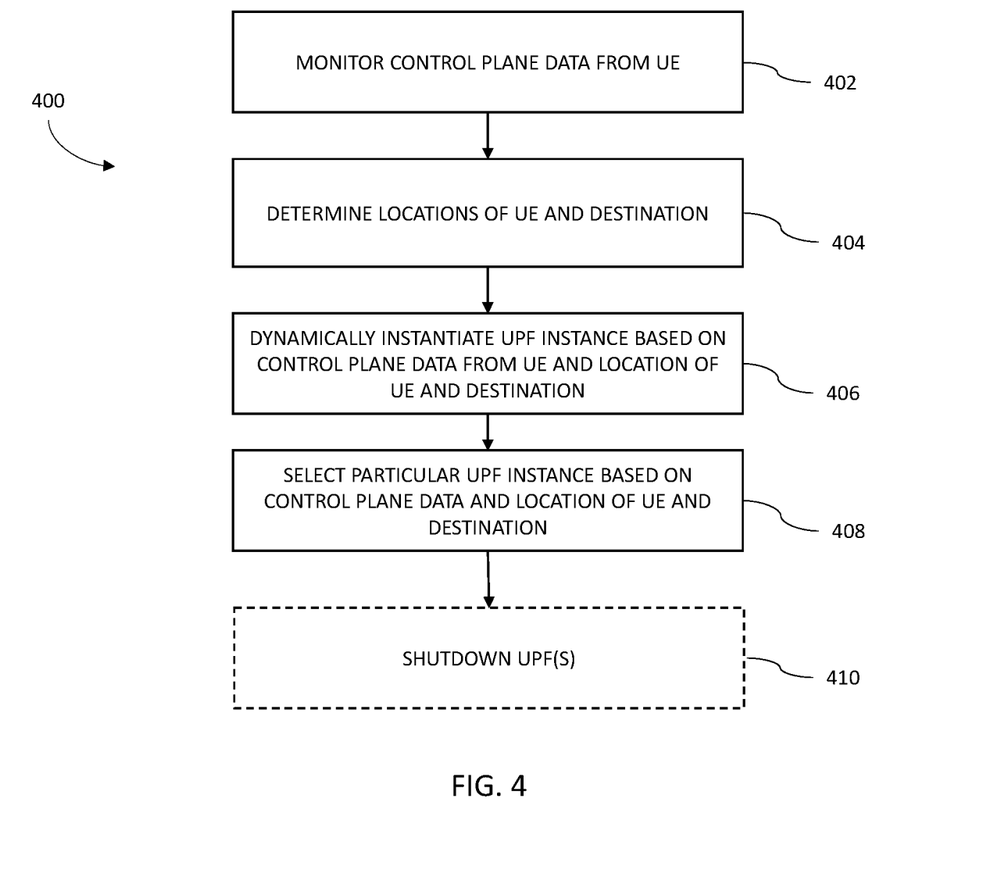
FIG. 4 is a flow diagram of an example method for dynamic user plane function placement and selection.

FIG. 4 is a flow diagram of an example method 400 for reducing latency and/or resource management in a 5G network. The common features discussed above with respect to the 5G networks 100, 200 in FIGS. 1-2 can include similar characteristics to those discussed with respect to method 400 and vice versa.

The method 400 includes monitoring control plane data from a UE (block 402). In some examples, the control plane data from the UE is monitored when a session is being established with the UE. In some examples, the control plane data is monitored by the one or more virtualized network entities communicatively coupled to the one or more UPF instances. The control plane data can include, for example, a type of bearer (for example, a guaranteed bit rate (GBR) bearer) requested by the UE, a parameter indicating quality of service (QoS) requirements of each packet (for example, QoS Class Identifier (QCI)), a type of network, a data network name for the UE, and/or a data network name for the destination of packets.

The method 400 further includes determining a location of the UE and a destination (block 404). In some examples, the one or more virtualized network entities (for example, the SMF) communicatively coupled to the one or more UPF instances determine the location of the UE and the destination based on the CU and the radio cloud that is being communicated with for the source UE and the destination for the packets. In some examples, the one or more virtualized network entities use the data network name associated with the source UE and the destination to determine a location of the UE and destination since the source UE and destination for the packets will not be known prior to transmission of the packets. In such examples, the one or more virtualized network entities treat all UEs in a data network as local and the data network can be classified as a local network for those UEs. Any UE that requests to communicate with the data network is classified as being in the radio cloud serving that data network.

The method 400 further includes dynamically instantiating a UPF instance at a particular location in the 5G network based on the control plane data and the location of the UE and destination (block 406). In this context, the instantiation (placement) of the UPF instance is dynamic in that the UPF instance is instantiated at runtime on an as needed basis rather than at startup like block 302 of method 300. When the control plane data from the UE indicates that UE is requesting a GBR bearer and/or higher QoS requirements (for example, URLLC cases), the one or more virtualized network entities dynamically instantiate a UPF instance at a particular location such that latency between the UE and the destination is reduced and the QoS requirements can be met. In some examples, the UPF instance is dynamically instantiated at a particular location that is closest to the UE and the destination. In some examples, the UPF instance is dynamically instantiated at a particular location that is closest to the data network of the UE and/or the destination. In some examples, the UPF instance is dynamically instantiated at a particular location that provides the shortest path between the UE and the destination. In some examples, the UPF instance is dynamically instantiated in the edge cloud or the radio cloud.

In some examples, the UPF instance is dynamically instantiated using an orchestration function (such as orchestration function 218), and the orchestration function is configured to dynamically instantiate the UPF instance based on information in a data file (for example, a manifest). In some such examples, the SMF of the 5G network updates the data file to include information regarding the available resources in the 5G network where a UPF instance can be instantiated and the affinity requirements for the UPF instance (for example, the cloud (radio, edge, or central) node affinity or pod affinity with a CU-CP VNF or CU-UP VNF), and the orchestration function determines the particular location where the UPF instance will be dynamically instantiated.

The method 400 further includes selecting the UPF instance to use for communication based on the control plane data from the UE and the location of the UE and destination (block 408). In examples where a UPF instance is dynamically instantiated as discussed with respect to block 406, the one or more virtualized network entities (for example, the SMF) select that particular UPF instance.

In some examples, the method 400 further includes shutting down a UPF instance (block 410). In some examples, the one or more virtualized network entities (for example, the SMF) are configured to shutdown at least one UPF instance in response to an indication that the UPF instance has crashed or is overloaded. In some examples, the one or more virtualized network entities (for example, the SMF) are configured to shutdown at least one UPF instance in response to an indication that the UPF instance is not currently being used. In some examples, the one or more virtualized network entities (for example, the SMF) are configured to shutdown at least one UPF instance in response to an indication that the UPF instance is not currently being used and a timeout period has expired. In some examples, the one or more virtualized network entities (for example, the SMF) are configured to shutdown at least one UPF instance in response to an indication that the UPF instance is to be consolidated with another UPF instance (for example, to conserve resources). It should be understood that any combination of the above factors can trigger the one or more virtualized network entities to initiate a shutdown of a UPF instance.

In some examples, a UPF instance can be configured to implement its own shutdown based on the above criteria in addition to (or instead of) the one or more virtualized network entities being configured to shut down the UPF instance.

Figure 5:
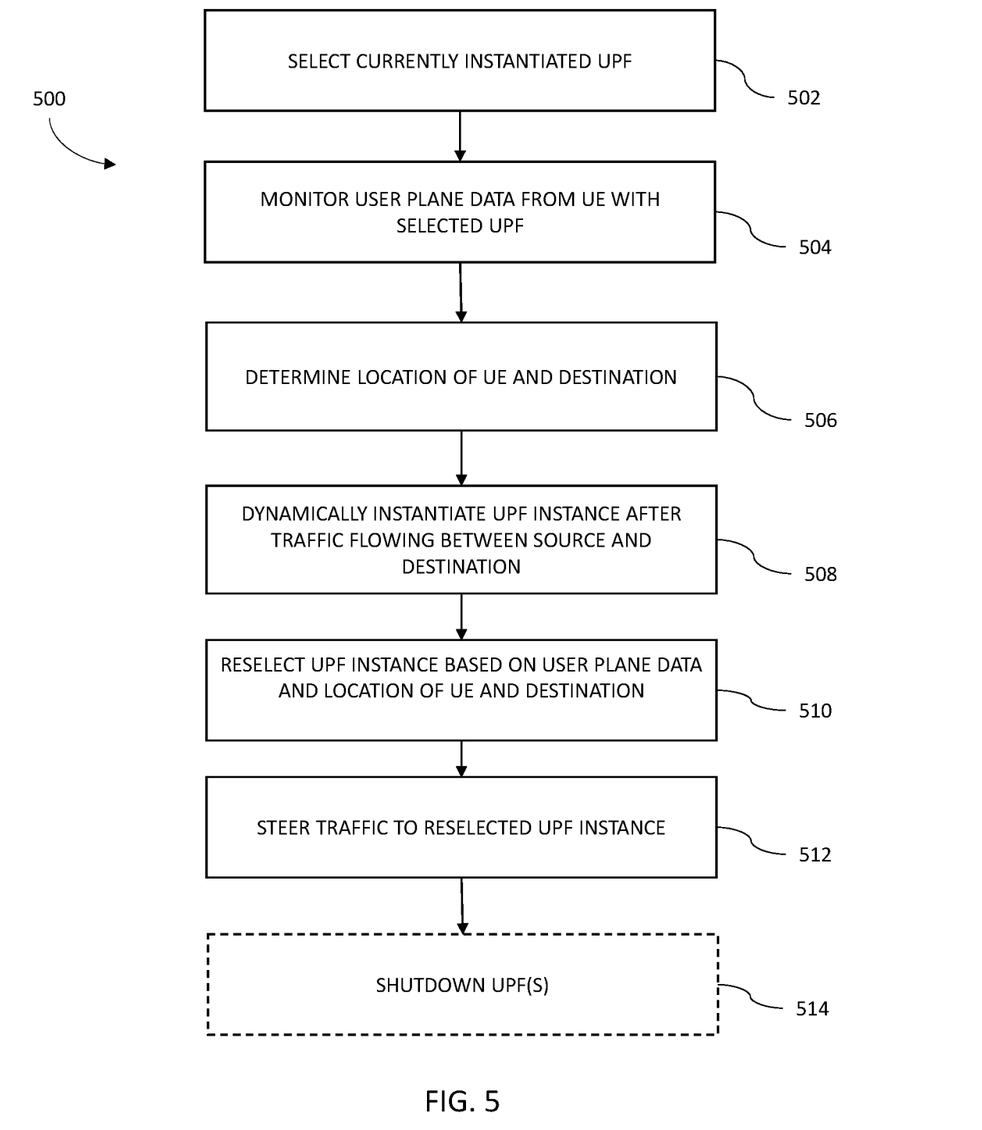
FIG. 5 is a flow diagram of an example method for dynamic user plane function selection.

FIG. 5 is a flow diagram of an example method for reducing latency and/or resource management in a 5G network. The common features discussed above with respect to the 5G networks 100, 200 in FIGS. 1-2 can include similar characteristics to those discussed with respect to method 500 and vice versa.

The method 500 begins with selecting a currently instantiated UPF instance to use for communication (block 502). In some examples, the one or more virtualized network entities (for example, the SMF) selects the currently instantiated UPF instance without determining a location of the source UE and destination. This functions as an initial selection and reselection of another UPF will likely be required to further reduce latency for communication between the source UE and the destination.

The method 500 further includes monitoring user plane data from a UE with the selected UPF instance (block 504). In some examples, monitoring user plane data from a UE includes determining whether packets are flowing between the UE and a destination via the selected UPF. In some examples, monitoring user plane data from a UE includes determining the IP addresses of the source UE and the destination. In some examples, the selected UPF instance provides the user plane data to one or more virtualized network entities for further use. In some such examples, the selected UPF instance provides the user plane data to one or more virtualized network entities when the selected UPF determines that the source UE and the destination are in the same radio cloud The method 500 further includes determining a location of the UE and a destination (block 506). In some examples, the one or more virtualized network entities (for example, the SMF) communicatively coupled to the selected UPF instance determine the location of the UE and the destination based on the CU and the radio cloud that is being communicated with for the source UE and the destination for the packets. In some examples, the one or more virtualized network entities use the data network name associated with the source UE and the destination to determine a location of the UE and destination. In such examples, the one or more virtualized network entities treat all UEs in a data network as local and the data network can be classified as a local network for those UEs. Any UE that requests to communicate with the data network is classified as being in the radio cloud serving that data network. In other examples, the IP addresses of the source UE and the destination are used to determine the location of the UE and the destination.

In some examples, the method 500 further includes dynamically instantiating a UPF instance at a particular location in the 5G network based on the user plane data and the location of the UE and destination (block 508). In this context, the instantiation (placement) of the UPF instance is dynamic in that the UPF instance is instantiated at runtime on an as needed basis rather than at startup like block 302 of method 300. When the user plane data indicates that packets are flowing between the UE and the destination, the one or more virtualized network entities dynamically instantiate a UPF instance at a particular location such that latency between the UE and the destination is reduced and the QoS requirements can be met. In some examples, the UPF instance is dynamically instantiated at a particular location that is closest to the UE and the destination. In some examples, the UPF instance is dynamically instantiated at a particular location that is closest to the data network of the UE and/or the destination. In some examples, the UPF instance is dynamically instantiated at a particular location that provides the shortest path between the UE and the destination. In some examples, the UPF instance is dynamically instantiated in the edge cloud or the radio cloud.

In some examples, the UPF instance is dynamically instantiated using an orchestration function (such as orchestration function 218), and the orchestration function is configured to dynamically instantiate the UPF instance based on information in a data file (for example, a manifest). In some such examples, the SMF of the 5G network updates the data file to include information regarding the available resources in the 5G network where a UPF instance can be instantiated and the affinity requirements for the UPF instance (for example, the cloud (radio, edge, or central) node affinity or pod affinity with a CU-CP VNF or CU-UP VNF), and the orchestration function determines the particular location where the UPF instance will be dynamically instantiated.

The method 500 further includes reselecting the UPF instance to use for communication (block 510). In examples where a UPF instance is dynamically instantiated as discussed with respect to block 508, the one or more virtualized network entities (for example, the SMF) (re)select that particular UPF instance for use by the UE for communication. In examples where a UPF instance is not dynamically instantiated (for example, when using a currently instantiated UPF instance offers the lowest latency path), the one or more virtualized network entities (for example, the SMF) (re)select a currently instantiated UPF instance in a manner similar to block 308 described above with respect to FIG. 3.

In some examples, the method 500 further includes steering traffic to the (re)selected UPF instance (block 512). When the reselection of the UPF instance takes place after packets have started flowing between the UE and the destination, the traffic of packets needs to be routed to the proper UPF instance after the reselection. The packets flowing between the UE and the destination are forwarded from the originally selected UPF instance to the reselected UPF instance either directly or through one or more additional UPF instances communicatively coupled between the originally selected UPF instance and the reselected UPF instance.

In some examples, the method 500 further includes shutting down a UPF instance (block 514). In some examples, the one or more virtualized network entities (for example, the SMF) are configured to shutdown at least one UPF instance in response to an indication that the UPF instance has crashed or is overloaded. In some examples, the one or more virtualized network entities (for example, the SMF) are configured to shutdown at least one UPF instance in response an indication that the UPF instance is not currently being used. In some examples, the one or more virtualized network entities (for example, the SMF) are configured to shutdown at least one UPF instance in response an indication that the UPF instance is not currently being used and a timeout period has expired; and/or (3) an indication that the UPF instance is to be consolidated with another UPF instance. It should be understood that any combination of the above factors can trigger the one or more virtualized network entities to initiate a shutdown of a UPF instance.

In some examples, a UPF instance can be configured to implement its own shutdown based on the above criteria in addition to (or instead of) the one or more virtualized network entities being configured to shut down the UPF instance.

The method 500 described above can be implemented in a multiple operator, neutral host deployment (for example, a Multi Operator Radio Access Network (MORAN) deployment). In such implementations, the UPF instances can be dynamically selected (and instantiated) to reduce latency between the UE and the destination and traffic can be steered to the newly selected UPF instance when the UPF instances are configured to treat packets in this manner for multiple operators.

Similar techniques to the dynamic UPF instance selection for methods 300, 400, 500 described above can be used to accommodate a UE that moves between cells. When a UE moves from one cell to another, the one or more virtualized network entities can reselect the UPF instance to reduce latency for communications between the UE and the destination. In some examples, reselection of the UPF instance includes selecting a different statically instantiated UPF instance based on control plane data and the location of the UE and destination in a manner similar to that described above with respect to block 308 of FIG. 3. In some examples, reselection of the UPF instance includes dynamically instantiating a UPF instance at a particular location based on control plane data and the location of the UE and destination in a manner similar to that described above with respect to block 408 of FIG. 4. In some examples, reselection of the UPF instance is based on user plane data and the location of the UE and destination and includes steering traffic to the newly selected UPF instance in a manner similar to that described above with respect to block 510 of FIG. 5.

In some examples, a profile for a UE can be maintained by the one or more virtualized network entities that includes past configuration details that includes previous locations of UPF instances utilized for the UE, movement patterns of the UE, etc. In some such examples, the profile for the UE is generated by a radio intelligent controller (for example, using machine learning).

Other examples are implemented in other ways.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random-access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

EXAMPLE EMBODIMENTS

Example 1 includes a system, comprising: a scalable cloud environment configured to implement: a base station using a plurality of virtualized base station entities, wherein each virtualized base station entity of the plurality of virtualized base station entities is configured to implement at least some functions for one or more layers of a wireless interface used to communicate with user equipment; one or more user plane function (UPF) instances that are instantiated at one or more locations of the system, wherein the one or more UPF instances are communicatively coupled to at least one virtualized base station entity of the plurality of virtualized base station entities; and one or more virtualized network entities communicatively coupled to the one or more UPF instances, wherein the one or more virtualized network entities are configured to: instantiate the one or more UPF instances at the one or more locations of the system; monitor control plane data and/or user plane data from the user equipment; determine a location of the user equipment and a destination; and select a particular UPF instance for a communication path used by the user equipment based on the control plane data, the user plane data, and/or the location of the user equipment and the destination.

Example 2 includes the system of Example 1, wherein the one or more UPF instances includes a plurality of UPF instances; wherein the one or more virtualized network entities are configured to instantiate the plurality of UPF instances statically and select the particular UPF instance from the plurality of UPF instances.

Example 3 includes the system of Example 1, wherein the one or more virtualized network entities are configured to instantiate the one or more UPF instances dynamically.

Example 4 includes the system of Example 3, wherein the one or more virtualized network entities are configured to instantiate the one or more UPF instances dynamically based on the control plane data and the location of the user equipment and the destination.

Example 5 includes the system of Example 4, wherein the one or more virtualized network entities are configured to instantiate the one or more UPF instances dynamically based on affinity information that identifies each virtualized base station entity of the plurality of virtualized base station entities with which the one or more UPF instances are required to be collocated.

Example 6 includes the system of Example 3, wherein the one or more virtualized network entities are configured to instantiate the one or more UPF instances dynamically based on the user plane data and the location of the user equipment and the destination.

Example 7 includes the system of Example 6, wherein the user plane data includes traffic flow information indicating that packets are flowing between the user equipment and the destination; wherein the one or more UPF instances are configured to forward the packets to the particular UPF instance selected by the one or more virtualized network entities.

Example 8 includes the system of any of Examples 3-7, wherein the one or more virtualized network entities are configured to shutdown at least one UPF instance in response to: an indication that the at least one UPF instance has crashed or is overloaded; an indication that the at least one UPF instance is not currently being used; an indication that the at least one UPF instance is not currently being used and a timeout period has expired; and/or an indication that the at least one UPF instance is to be consolidated with another UPF instance.

Example 9 includes the system of any of Examples 1-8, wherein the one or more virtualized network entities are configured to select the particular UPF instance that provides a communication path with lowest latency between the user equipment and the destination and where quality of service requirements can be met.

Example 10 includes the system of any of Examples 1-9, wherein the one or more virtualized network entities are configured to instantiate the particular UPF instance at a particular location of the system that provides a communication path with lowest latency between the user equipment and the destination and where quality of service requirements can be met.

Example 11 includes the system of any of Examples 1-10, wherein the one or more virtualized network entities include a Session Management Function (SMF) and/or a service orchestration function.

Example 12 includes a method, comprising: using a scalable cloud environment to implement: a base station using a plurality of virtualized entities, wherein each virtualized entity of the plurality of virtualized entities is configured to implement at least some functions for one or more layers of a wireless interface used to communicate with user equipment; one or more user plane functions (UPFs) instantiated at one or more locations in a network, wherein the one or more UPFs are communicatively coupled to at least one virtualized entity of the plurality of virtualized entities; and one or more virtualized network entities communicatively coupled to the one or more UPFs, wherein the one or more virtualized network entities are configured to: instantiate the one or more UPFs at the one or more locations in the network; monitor control plane data and/or user plane data from the user equipment; determine a location of the user equipment and a destination; and select a particular UPF of the one or more UPFs for a communication path used by the user equipment based on the control plane data, the user plane data, and/or the location of the user equipment and the destination.

Example 13 includes the method of Example 12, wherein the one or more UPFs includes a plurality of instantiated UPFs instantiated statically; wherein the one or more virtualized network entities are configured to instantiate the plurality of instantiated UPFs statically and select the particular UPF that provides a communication path with lowest latency between the user equipment and the destination.

Example 14 includes the method of Example 12, wherein the one or more virtualized network entities are configured to instantiate the one or more UPFs dynamically based on the control plane data, the user plane data, and/or the location of the user equipment and the destination.

Example 15 includes the method of Example 14, wherein the one or more virtualized network entities are configured to shutdown at least one UPF in response to: an indication that the at least one UPF has crashed or is overloaded; an indication that the at least one UPF is not currently being used; an indication that the at least one UPF is not currently being used and a timeout period has expired; or an indication that the at least one UPF is to be consolidated with another UPF instance.

Example 16 includes the method of any of Examples 14-15, wherein the one or more virtualized network entities are configured to instantiate the one or more UPFs dynamically based on the control plane data and the location of the user equipment and the destination.

Example 17 includes the method of Example 16, wherein the one or more virtualized network entities are configured to instantiate the one or more UPFs dynamically based on affinity information that identifies each virtualized base station entity of the plurality of virtualized base station entities with which the one or more UPFs are required to be collocated.

Example 18 includes the method of any of Examples 14-15, wherein the one or more virtualized network entities are configured to instantiate the one or more UPFs dynamically based on the user plane data and the location of the user equipment and the destination.

Example 19 includes the method of Example 12-19, wherein the user plane data includes traffic flow information indicating that packets are flowing between the user equipment and the destination; wherein the one or more UPFs are configured to forward the packets to the particular UPF selected by the one or more virtualized network entities.

Example 20 includes the method of any of Examples 12-19, wherein the control plane data includes: a type of bearer requested by the user equipment; a parameter indicating quality of service (QoS) requirements of each packet; a type of network; a data network name for the user equipment; and/or a data network name for the destination.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A system, comprising:
   a scalable cloud environment configured to implement:
      a base station using a plurality of virtualized base station entities, wherein each virtualized base station entity of the plurality of virtualized base station entities is configured to implement at least some functions for one or more layers of a wireless interface used to communicate with user equipment;
      one or more user plane function (UPF) instances that are instantiated at one or more locations of the system, wherein the one or more UPF instances are communicatively coupled to at least one virtualized base station entity of the plurality of virtualized base station entities; and
      one or more virtualized network entities communicatively coupled to the one or more UPF instances, wherein the one or more virtualized network entities are configured to:
   dynamically instantiate the one or more UPF instances at the one or more locations of the system based on a first location of the user equipment, a second location of a destination for packets, and at least one of control plane data or user plane data;
   monitor at least one of the control plane data or the user plane data from the user equipment;
   determine the first location of the user equipment and the second location of the destination for the packets; and
   select a particular UPF instance for a communication path used by the user equipment based on the control plane data, the user plane data, the first location of the user equipment and the second location of the destination for the packets.

2. The system of claim 1, wherein the one or more UPF instances includes a plurality of UPF instances;
   wherein the one or more virtualized network entities are configured to dynamically instantiate the plurality of UPF instances and select the particular UPF instance from the plurality of UPF instances.

3. The system of claim 1, wherein the one or more virtualized network entities are configured to dynamically instantiate the one or more UPF instances based on the control plane data, the first location of the user equipment, or the second location of the destination for the packets.

4. The system of claim 3, wherein the one or more virtualized network entities are configured to dynamically instantiate the one or more UPF instances based on affinity information that identifies each virtualized base station entity of the plurality of virtualized base station entities with which the one or more UPF instances are required to be collocated.

5. The system of claim 1, wherein the one or more virtualized network entities are configured to dynamically instantiate the one or more UPF instances based on the user plane data, the first location of the user equipment, or the second location of the destination for the packets.

6. The system of claim 5, wherein the user plane data includes traffic flow information indicating that the packets are flowing between the user equipment and the destination for the packets;
   wherein the one or more UPF instances are configured to forward the packets to the particular UPF instance selected by the one or more virtualized network entities.

7. The system of claim 1, wherein the one or more virtualized network entities are configured to shutdown at least one UPF instance in response to at least one of:
   an indication that the at least one UPF instance has crashed or is overloaded;
   an indication that the at least one UPF instance is not currently being used;
   an indication that the at least one UPF instance is not currently being used and a timeout period has expired; or
   an indication that the at least one UPF instance is to be consolidated with another UPF instance.

8. The system of claim 1, wherein the one or more virtualized network entities are configured to select the particular UPF instance that provides the communication path with lowest latency between the user equipment and the destination for the packets and where quality of service requirements can be met.

9. The system of claim 1, wherein the one or more virtualized network entities are configured to dynamically instantiate the particular UPF instance at a particular location of the system that provides the communication path with lowest latency between the user equipment and the destination for the packets and where quality of service requirements can be met.

10. The system of claim 1, wherein the one or more virtualized network entities include at least one of a Session Management Function (SMF) or a service orchestration function.

11. A method, comprising:
using a scalable cloud environment configured to implement:
a base station using a plurality of virtualized entities, wherein each virtualized entity of the plurality of virtualized entities is configured to implement at least some functions for one or more layers of a wireless interface used to communicate with user equipment;
one or more user plane functions (UPFs) instantiated at one or more locations in a network, wherein the one or more UPFs are communicatively coupled to at least one virtualized entity of the plurality of virtualized entities;
one or more virtualized network entities communicatively coupled to the one or more UPF instances, wherein the one or more virtualized network entities are configured to:
dynamically instantiate the one or more UPFs at the one or more locations in the network based on a first location of the user equipment, a second location of a destination for packets, and at least one of control plane data or user plane data;
monitor at least one of the control plane data or the user plane data from the user equipment;
determine the first location of the user equipment and the second location of the destination for the packets; and
select a particular UPF of the one or more UPFs for a communication path used by the user equipment based on the control plane data, the user plane data, the first location of the user equipment and the second location of the destination for the packets.

12. The method of claim 11, wherein the one or more UPFs includes a plurality of instantiated UPFs instantiated dynamically;
wherein the one or more virtualized network entities are configured to dynamically instantiate the plurality of instantiated UPFs and select the particular UPF that provides the communication path with lowest latency between the user equipment and the destination for the packets.

13. The method of claim 11, wherein the one or more virtualized network entities are configured to dynamically instantiate the one or more UPFs based on at least one of the control plane data, the user plane data, the first location of the user equipment, or the second location of the destination.

14. The method of claim 13, wherein the one or more virtualized network entities are configured to shutdown at least one UPF in response to at least one of:
an indication that the at least one UPF has crashed or is overloaded;
an indication that the at least one UPF is not currently being used;
an indication that the at least one UPF is not currently being used and a timeout period has expired; or
an indication that the at least one UPF is to be consolidated with another UPF instance.

15. The method of claim 11, wherein the one or more virtualized network entities are configured to dynamically instantiate the one or more UPFs based on the control plane data, the first location of the user equipment, or the second location of the destination for the packets.

16. The method of claim 15, wherein the one or more virtualized network entities are configured to dynamically instantiate the one or more UPFs based on affinity information that identifies each virtualized base station entity of the one or more virtualized network entities with which the one or more UPFs are required to be collocated.

17. The method of claim 11, wherein the one or more virtualized network entities are configured to dynamically instantiate the one or more UPFs based on the user plane data, the first location of the user equipment, or the second location of the destination for the packets.

18. The method of claim 11, wherein the user plane data includes traffic flow information indicating that the packets are flowing between the user equipment and the destination for the packets;
wherein the one or more UPFs are configured to forward the packets to the particular UPF selected by the one or more virtualized network entities.

19. The method of claim 11, wherein the control plane data includes at least one of:
a type of bearer requested by the user equipment;
a parameter indicating quality of service (QOS) requirements of each packet of the packets;
a type of network;
a data network name for the user equipment; or
a data network name for the destination.

* * * * *